Oct. 6, 1959 L. E. BENSON ET AL 2,907,595
SEALING GLANDS FOR ROTATING MACHINES
Filed Oct. 14, 1955
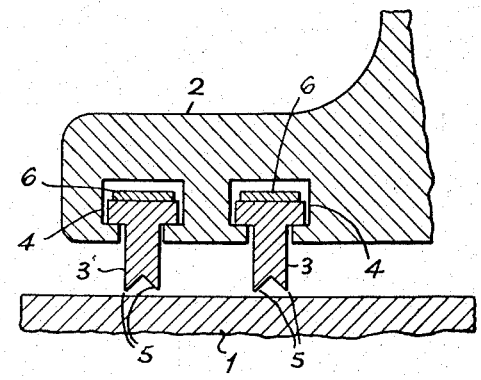
INVENTORS
Leonard Ellis Benson
Thomas Raine

2,907,595

SEALING GLANDS FOR ROTATING MACHINES

Leonard Ellis Benson, Sale, and Thomas Raine, Bramhall, England, assignors to Metropolitan-Vickers Electrical Company Limited, London, England, a British company Application October 14, 1955, Serial No. 540,574

Claims priority, application Great Britain October 18, 1954

3 Claims. (Cl. 286—10)

This invention relates to machines having relatively rotating parts and is concerned with effecting gas sealing.

The invention has an important application inter alia in steam turbines, gas turbines and electricity generators.

In known types of glands between a shaft and a surrounding casing the shaft part or a sleeve on the shaft may be plain or may carry a series of circumferential grooves, or ribs or fins. This member rotates within a stationary member forming part of the outer casing of the machine, the clearance between the two members being very small so as to hinder the passage of gas. Frequently, both members are grooved or ribbed in such a way as to provide a labyrinth with a multiplicity of sharp edges and fine clearances to hinder the escape of gas. The clearances should be as fine as possible without actually rubbing together but if the two members do rub together it is desirable that one or both should wear away quickly and with the minimum generation of heat. If this does not happen the rubbing may cause serious damage and the generation of heat may cause undesirable distortion.

The materials from which gland members have usually been made hitherto are metals such as steel, brass or bronze, which are produced either as castings or wrought by conventional means into the form of forgings, bar, tube, sheet and strip.

The present invention comprises a labyrinth gas gland between relatively rotating parts in which one or both of the parts liable to rub against each other are of a sintered metal.

It has been found from experiment that sintered forms of metal, as distinct from cast or wrought metals have the advantage that they rub away more readily with less generation of heat due to friction than in the case of cast or wrought metals.

Suitable materials are sintered iron, sintered nickel or other sintered metal or alloy.

Preferably the sintered materials used are not completely bonded, i.e. they are incompletely sintered forms of the materials, in which the bonding of the particles is not complete.

Sintered forms of iron should be satisfactory for gland materials operating at temperatures up to 750°–850° F. but for higher temperatures where greater resistance to oxidation may be necessary other sintered materials would be preferred, for example, sintered nickel containing graphite or sintered alloys such as nickel-chromium or nickel-cobalt-chromium.

The accompanying drawing is a partial longitudinal cross section which shows an example of apparatus embodying the invention in which sealing is effected between a rotating shaft 1 and a stationary casing 2 which may for example be the casing of a turbine. Gland segments 3 are supported in grooves 4 in the casing 1. In the example shown the gland segments are shown with sharp edges 5. Leaf springs 6 hold the segments 3 downwards towards the shaft 1.

With metals as used hitherto when rubbing occurs the metal melts and in the case, for example, of a gas turbine this will allow escape of the hot gases and the heat may cause distortion of the shaft. A sintered metal, on the contrary, will wear away sufficiently to avoid rubbing but not sufficiently to cause escape of the gases.

What we claim as new and desire to secure by Letters Patent of the United States is:

1. The method of using a labyrinth gas sealing gland as a sealing element between relatively moving parts comprising the steps of: providing for a sealing gland member with at least one sealing surface composed of a sintered powdered metal composition having an incomplete bond between the particles of said powdered metal so that said sealing surface is softer than the surface of the rotating one of said parts but wherein said bond is sufficiently strong to retain the shape of said gland member, and inserting said sealing gland member between said relatively moving parts so that said sealing surface contacts a rotating one of said parts and quickly wears to conformity therewith without substantial generation of heat.

2. The method of using a labyrinth gas sealing gland as a sealing element between relatively moving parts comprising the steps of: providing for a sealing gland member with at least one annular sealing edge composed of a sintered powdered iron composition having an incomplete bond between the particles of said powdered metal so that said sealing edge is softer than the surface of the rotating one of said parts but wherein said bond is sufficiently strong to retain the shape of said gland member, inserting said gland member between said relatively moving parts so that the sealing edge contacts the rotating one of said parts and quickly wears to conformity with the surface of the rotating one of said parts at a substantially faster rate than a completely bonded composition and without substantial generation of heat due to friction between the surfaces of contact.

3. The method of using a labyrinth gas sealing gland as a sealing element for at least one moving part comprising the steps of: providing said sealing gland member with at least one sealing surface composed of a sintered powdered metal composition having an incomplete bond between the particles of said powdered metal so that said sealing surfaces is softer than the surface of said part but wherein said bond is sufficiently strong to retain the shape of said gland, applying said sealing gland member to said part so that said sealing surface contacts the surface of said moving part and quickly wears to conformity therewith without substantial generation of heat due to friction between said surfaces of contact.

References Cited in the file of this patent

UNITED STATES PATENTS

| | | |
|---|---|---|
| 957,887 | Junggren | May 17, 1910 |
| 2,372,203 | Hensel et al. | Mar. 29, 1945 |
| 2,391,577 | Larson | Dec. 25, 1945 |
| 2,571,868 | Haller | Oct. 16, 1951 |
| 2,600,991 | Hargrove | June 17, 1952 |
| 2,680,410 | Kolb | June 8, 1954 |